United States Patent [19]
Reed et al.
[11] 3,809,816
[45] May 7, 1974

[54] COMMUNICATION SYSTEM UTILIZING FREQUENCY DIVISION MULTIPLEXING AND A FREQUENCY PLAN THEREFOR

[75] Inventors: Joseph Reed; Jonas M. Shapiro, both of Stamford; Athanassious Iliakidis, Norwalk, all of Conn.; Anthony Apostolakis, Santa Monica, Calif.

[73] Assignee: Litton Systems, Inc., Beverly Hills, Calif.

[22] Filed: June 23, 1972

[21] Appl. No.: 265,446

[52] U.S. Cl. .......................... 179/15 FD, 179/2.5 R
[51] Int. Cl. .......................................... H04j 1/06
[58] Field of Search ......... 179/15 FD, 15 FS, 2.5 R, 179/15 AL; 325/184; 331/19, 37, 38; 307/232

[56] References Cited

UNITED STATES PATENTS

| | | | |
|---|---|---|---|
| 3,548,106 | 12/1970 | Watson | 179/2.5 R |
| 3,550,132 | 12/1970 | Kurth | 179/2.5 R |
| 2,819,344 | 1/1958 | Thompson | 179/15 FS |
| 2,721,897 | 10/1955 | Schneckloth | 179/2.5 R |
| 2,607,853 | 8/1952 | Bellairs | 179/15 FD |
| 3,537,026 | 10/1970 | Leonard | 331/38 |
| 3,551,826 | 12/1970 | Sepe | 331/38 |

*Primary Examiner*—Kathleen H. Claffy
*Assistant Examiner*—David L. Stewart

[57] ABSTRACT

A communications system utilizing frequency division multiplexing is shown for providing switchable communication between any two stations through a frequency plan which uses a single reference frequency throughout the system. Each station is assigned a fixed home frequency at which it receives information and a second fixed home frequency at which it transmits information. When calling, the calling station adjusts its transmit and receive frequencies to correspond to the receive and transmit frequencies of the called station, respectively. Full duplex transmission is thus permitted between any and all stations over a single coaxial cable utilizing a fixed-adjustable paired frequency plan.

10 Claims, 3 Drawing Figures

COMMUNICATION SYSTEM UTILIZING FREQUENCY DIVISION MULTIPLEXING AND A FREQUENCY PLAN THEREFOR

BACKGROUND OF THE INVENTION

The present invention relates to a communications system utilizing frequency division multiplexing (FDM) and, more particularly, to a telephone communications system using frequency division multiplexing and a frequency plan that permits switchable full duplex transmission between any and all stations attached to a common cable.

Telephone systems of the prior art utilize central switching that is generally designed as a blocking system in order to reduce the cost and increase the number of system users. Since each communication circuit in a central switching system requires physical connection, it is not practical to provide a system which can interconnect all possible combinations or subscriber pairs simultaneously within that system. The number of circuits which can be provided in a system for a predesigned probability of blocking is determined by the established intensity of traffic in Erlangs, one Erlang being defined as equal to the number of calls times length of calls, divided by time in hours. When the traffic within a central switching system increases above the designed amount, the amount of degradation increases in a disproportionate manner. For example, in a fifty-connection system, a 30 percent increase in peak traffic load can reduce the grade of service from one blocked call in a thousand to one blocked call in thirty. Such an increase in traffic can be temporary or permanent and can be due to an increased number of calls being placed per subscriber, more time spent per call, an increased number of subscribers, or a change in the traffic pattern. If the change is permanent, the central switch can be expanded to accommodate it. If the change is temporary or due to an emergency, the degradation in grade of service is unavoidable.

A telephone communications system utilizing frequency division multiplexing as herein described allows all of the system subscribers to place their calls at any time quickly and directly, and guarantees access whereby any subscriber will be able to reach any other subscriber. Such a system is referred to as a non-blocking system.

A central switching system is susceptible to catastrophic failure should the central switch become damaged or fail in any one of a number of ways. The telephone communications system of the present invention utilizing frequency division multiplexing provides a highly reliable system due to the decentralized approach wherein there is no central switch and each subscriber station is, in effect, its own central switch. A failure in the system described here simply disables the single subscriber involved. Further, the communications system described here uses a single cable connecting all subscribers within the system which is simply and easily installed compaired to the numerous twisted wires required for the central switching system. Each subscriber station within the present system may be quickly and easily altered without extensive rewiring as in the central switching system.

The FDM telephone communications system of the present invention is capable of accommodating from ten to one thousand subscriber stations without using a centralized switch. This arrangement is advantageous even over a time division multiplexing (TDM) approach to telephone communications since time division multiplexing cannot service the maximum number of stations distributed over a single cable that frequency division multiplexing can. Further, due to the requirement for directed signal flow and the inherent random time delay in a cable system, time division multiplexing synchronization equipment becomes extremely complex.

Some prior art communications systems have utilized frequency division multiplexing wherein each station communicates with another at a single frequency over a pair of transmit and receive highways. The present invention uses two distinct frequencies to transmit and receive over a single highway. This arrangement simplifies system implementation and installation. It also reduces the problems of connection between the highways and makes it possible to introduce signal amplification so as to extend the range of operation.

SUMMARY OF THE INVENTION

It is accordingly an object of the present invention to provide an improved telephone communications system utilizing frequency division multiplex with a frequency plan that establishes non-blocking full duplex operation over a single coaxial cable.

Another object of the present invention is to provide a frequency division multiplexing telephone communications system which is substantially reduced in complexity compared to other systems, reliable, has a low installation cost, and is easily adapted to changing user requirements.

A further object of the invention described is to provide a telephone communications system utilizing frequency division multiplexing with a frequency plan which establishes an automatic relationship between the frequencies of the calling and called stations wherein the calling station is automatically tuned to the receiver frequency of the called station and automatically adjusts itself to receive the transmission frequency of the called station.

In accomplishing these and other objects, there has been provided a plurality of communication stations coupled to a single cable via transmit and receive circuit paths. A synthesizer within a calling station adjusts its output to establish a desired frequency and applies that frequency to the first transmit circuit path and then through a filtering network and a coupler to the cable. During this application, the frequency applied to the cable has been modulated, adjusted and filtered to match the fixed home receiver frequency of the called station for transmitting information thereto. The synthesizer in the calling station also applies its established frequency to the receive circuit path therein for automatically adjusting that circuit path to receive the transmit frequency from the called station. The frequency plan thus provides for full duplex transmission between any and all stations attached to the cable through a fixed-adjustable two frequency arrangement.

DESCRIPTION OF THE DRAWINGS

A better understanding of the present invention and of the objects and appendant advantages thereof will be obtained by reference to the following description when considered in connection with the accompanying drawings, wherein.

DESCRIPTION OF THE PREFERRED EMBODIMENT

Figure 1:
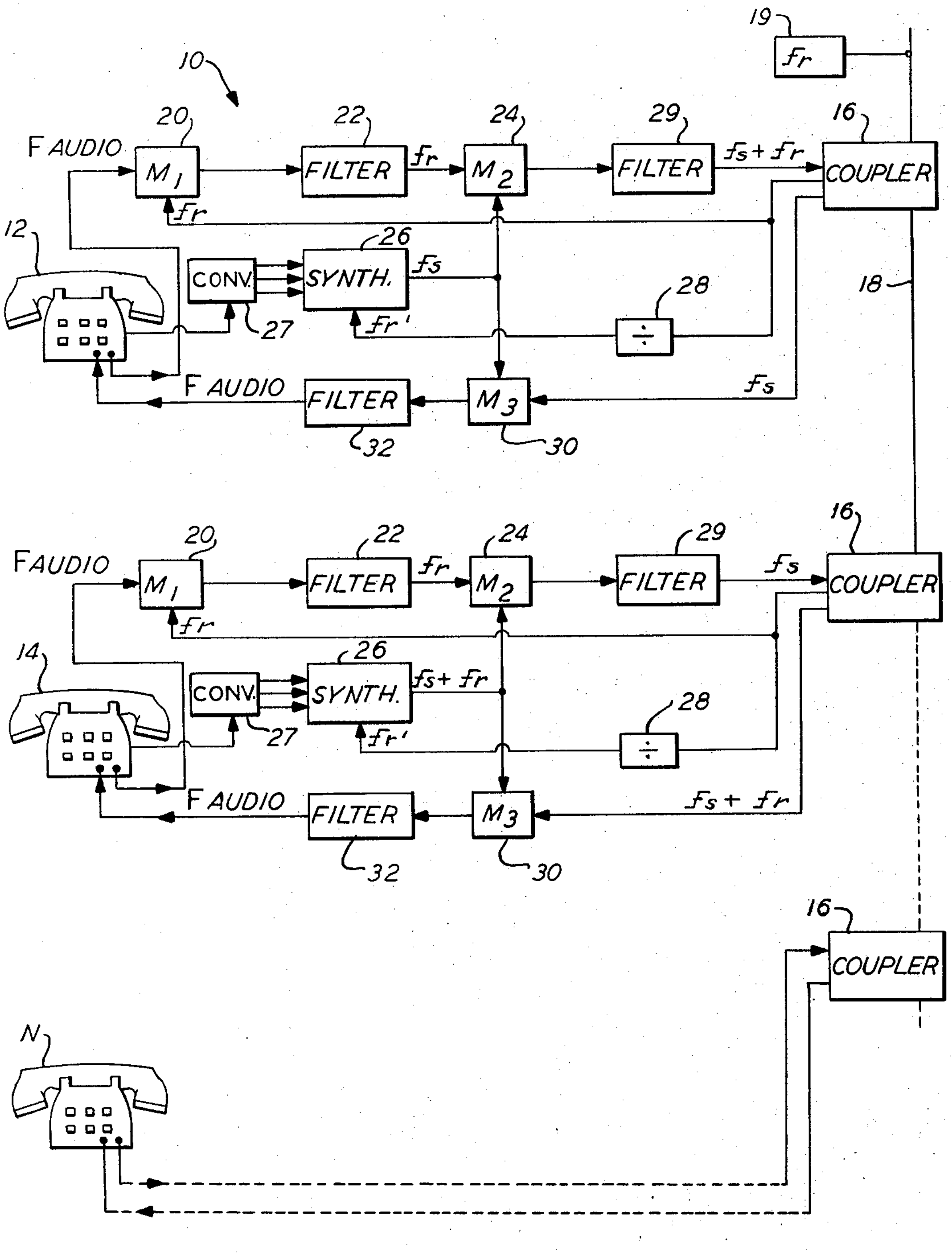
FIG. 1 is a block diagram showing the telephone communications system of the present invention.

Referring now to the drawings, FIG. 1 shows a telephone communications system 10 which utilizes a frequency division multiplexing arrangement for connecting a plurality of subscriber stations 12, 14 through N to one another for permitting full duplex non-blocking transmission between all stations. The stations are coupled through magnetic couplers 16 to a communication highway in the form of a coaxial cable 18. The couplers also provide DC power and a reference frequency $f_r$ to each station. The reference frequency $f_r$ is generated by a system frequency generator 19 connected to the coaxial cable 18. In the present embodiment, up to four stations are attached to a multi-coupler which, in turn, provides a signal to each of the four stations through an individual station coupler.

A typical station includes a handset in which a transmitter and receiver is located, as is well known. The transmitter applies an audio frequency to the input of a transmit circuit path formed by an input port of a balanced modulator 20 which is excited by the reference frequency $f_r$ applied thereto from magnetic coupler 16. The reference frequency which is distributed throughout the entire system is arranged to be outside the bandwidth of communication of the system. Its relationship to other communication frequencies will be demonstrated hereinbelow.

Audio signals entering the modulator 20 are modulated to produce a double sideband whose frequency is $f_r \pm f_{audio}$. This signal is then passed through a single sideband filter 22 which removes the remaining carrier and one of the two sidebands. As is known, a balanced modulator, specifically a push-pull circuit, introduces a carrier and a modulating signal such that after modulation takes place, the output contains generally the two sidebands with the carrier much reduced. The output of the filter 22 which removes one sideband is then $f_r + f_{audio}$. A second balanced modulator 24 receives the reference frequency plus audio signal $f_r + f_{audio}$ from the filter 22 at a first input port. The carrier applied to the second input port of the balanced modulator 24 is a frequency $f_s$ derived from a programable digital frequency synthesizer 26. The programable or adjustable frequency output of the synthesizer 26 is controlled by digital signals which may be generated from station 12 through a suitable digital signal connector such as a dual tone to digital signal converter 27. The synthesizer is driven by a reference frequency $f_{r'}$ derived by dividing the system reference signal $f_r$ in a divider 28. The output of modulator 24 is thus two sidebands at the frequency $f_s \pm (f_r + f_{audio})$ which is applied to the input terminal of a band pass filter 29 having a band pass width less than $2f_r$. That is, the band pass filter 24 will pass either the signal $f_s + f_r + f_{audio}$ or $f_s - (f_r + f_{audio})$ depending on the embodiment desired, but will not pass both signals.

The total bandwidth of the frequency division multiplexing communications system is restricted to less than an octave so that no station frequency second harmonic will fall within the usable bandwidth of a station and thereby create interference with that station. A more complete discussion of the reference frequency $f_r$, bandwidth of operation, and number of possible stations is set out hereinbelow with reference to FIGS. 2a and 2b.

The output signal from the band pass filter 29, for example $f_s + f_r + f_{audio}$ is applied to the input port of a magnetic coupler 16 and then via a coaxial cable 18 to subsequent couplers of the various stations 14 through N. Note that the magnetic coupler 16 also applies a received frequency signal to the input of a receive circuit path formed by an input port of a third balanced modulator 30 whose carrier input is the output frequency $f_s$ of the programable synthesizer 26. If the inputs from the synthesizer 26 and from the coupler 16 have the same carrier frequency $f_s$, the output from the modulator 30 will contain only the audio signal $f_{audio}$. Under these circumstances, the balanced modulator excited by the same frequency inputs will detect audio signals adjacent to that frequency in a manner known as synchronous detection. The output from the modulator 30 is then passed through a low band pass audio filter 32 to eliminate any undesirable frequencies outside the audio pass band. Thus, the output of filter 32 includes only the audio frequency $f_{audio}$ which is applied to the receiver of station 12.

By reference to FIG. 1, it will be apparent that the stations 14 through N are arranged with identical transmit and receive circuit paths, each utilizing a programable digital frequency synthesizer 26 and the same reference frequency $f_r$. In the present invention, each station is assigned a fixed home frequency at which it will receive modulated audio information and pass that information through its balanced modulator 30 for removing the carrier and detecting the audio signal for application to the receiver within the station handset. While each station receives audio information at its assigned fixed home frequency, it automatically transmits audio information at a second fixed home frequency whose difference in the present embodiment represents the assigned fixed home frequency plus the reference frequency $f_r$. For example, station 12 may be assigned a fixed home frequency of 12.01 Megahertz (MHz). If the reference frequency $f_r$ is assigned a frequency of 2.5 MHz, this automatically fixes the transmission frequency at 14.51 MHz.

As previously mentioned, the total bandwidth of the frequency division multiplexing system is restricted to less than an octave. That is, the ratio between the highest carrier frequency $f_2$ and the lowest carrier frequency $f_1$ within the frequency bandwidth of the system should be less than 2, see FIG. 2a.

$$f_2/f_1 \leq 2$$

Further, the lower frequency $f_1$, when subtracted from the upper frequency $f_2$, should be equal to, or less than, two times the reference frequency $f_r$.

$$f_2 - f_1 \leq 2f_r$$

To calculate the number of channels N for a full duplex system, let:

$k$ = audio bandwidth
$g$ = guard bandwidth
$\Delta f$ = bandwidth per channel
$\Delta f = 2k + g$
$N = (f_2 - f_1/2\ \Delta f)$ For $f_2 - f_1$, to approach a maximum:

$$f_2 - f_1 = 2f_r$$

$$N = (f_r/\Delta f)$$

If $f_r = 2.5$ MHz, then:
$f_1$ min. = 5 MHz
$f_2$ max. = 10 MHz
If $\Delta f = 10$ KHz, then:

$$N = f_r/(\Delta f) = (2{,}500/10) = 250 \text{ channels}$$

In the present embodiment, $f_1 = 10$ MHz and $f_2 = 15$ MHz. With these values, the total number of channels $N$ again equals 250. It will be seen that $f_2$ could be 20 MHz. Then, the reference frequency $f_r$ equals 5 MHz and the total number of channels $N$ equals 500.

Figure 2A:
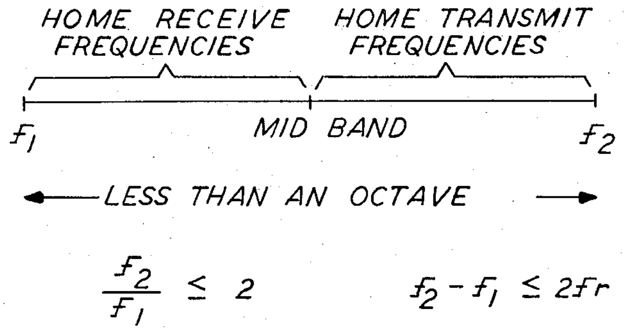
FIGS. 2a and 2b are diagrams useful in explaining the frequency plan of the frequency division multiplexing telephone communications system.
Figure 2B:
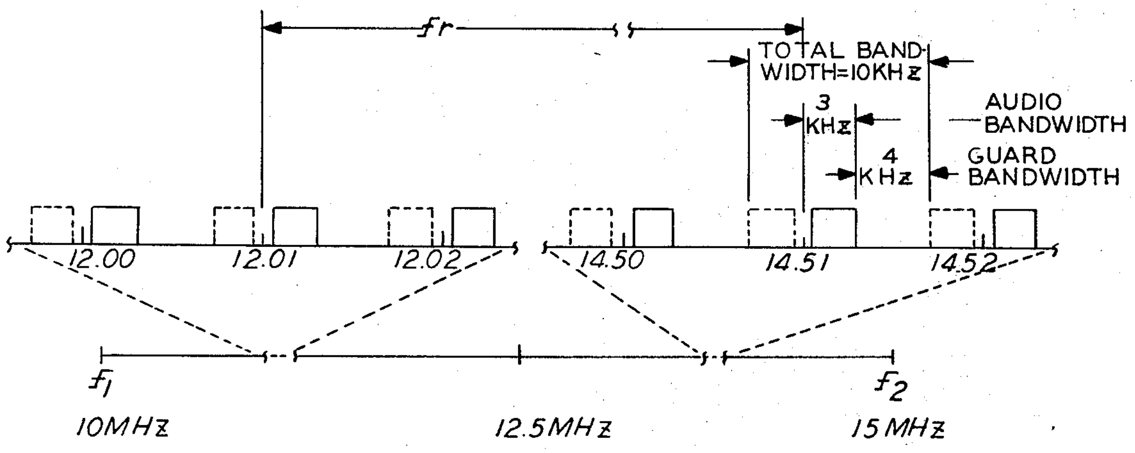

Referring now to FIGS. 2*a* and 2*b*, it will be seen that the minimum frequency $f_1$ and maximum frequency $f_2$ is represented by a line showing the various frequencies within the bandwidth of the frequency division multiplexing system between $f_1$ and $f_2$ wherein the lower frequencies represent the fixed home receive frequencies and the higher frequencies represent the fixed home transmit frequencies. In the present system, 250 channels are provided between 10 MHz and 15 MHz with the reference frequency established at 2.5 MHz. It will be seen that each station 12 through N is assigned a different fixed home frequency. For example, station 12 is assigned a receive frequency of 12.01 MHz. The audio sideband of each channel is 3 KHz wide with the guard band between it and the next frequency being 4 KHz wide. Thus, the next assigned receive frequency is 12.02 MHz. Station 12 then transmits on a fixed home frequency of 14.51 MHz, while the next station transmits at a frequency of 14.52 MHz.

Referring now to FIGS. 1 and 2*a* and 2*b*, the frequency plan of the present invention will be described as it applies to the operation of the FDM telephone communications system. Assuming station 14 is the calling station, the handset is removed while that station adjusts the output frequency of its synthesizer 26 to match the receive frequency of the called station plus the reference frequency $f_s + f_r$. Assuming station 14 is calling station 12, the output of the synthesizer 26 at station 14 is adjusted such that its programable frequency $f_s$ becomes 12.01 MHz (the called stations receive frequency) plus the reference frequency $f_s + f_r$ or 14.51 MHz. The 14.51 MHz signal is applied both to the balanced modulator 24 and to the balanced modulator 30 of station 14. When the handset is removed from station 14 the transmitter therein may be enabled thereby applying audio frequencies $f_{audio}$ to the input of the balanced modulator 20. The balanced modulator 20 is also supplied with a carrier, i.e., the reference frequency of 2.5 MHz. Thus, the audio signals entering balanced modulator 20 are modulated to produce a double sideband signal whose frequency is $f_r \pm f_{audio}$. This signal is then passed through the single sideband filter 22 which removes the remaining carrier and one of the sidebands for providing an output frequency of $f_r + f_{audio}$, for example.

At the second balanced modulator 24, the signals from the filter 22 ($f_r + f_{audio}$) and the signals from the synthesizer ($f_s + f_r$) are combined. Ignoring the audio frequency for the moment, the output of the balanced modulator 24 becomes $f_s$ and $f_s + 2f_r$. This pair of signals, ignoring audio, is then passed through the filter 29 which has a bandwidth of less than $2f_r$. This eliminates one of the signals (in this case $f_s + 2f_r$. Then $f_s = 14.51 - 2.5$ or 12.01 MHz. Thus, the signal applied to the magnetic coupler 16 is $f_s$ or 12.01 MHz; the signal $f_s + 2f_r$ having been removed by the filter 29. This signal travels over the coaxial cable 18 to the magnetic coupler 16 of station 12 and, as a practical matter, to all couplers within the system. However, the third balanced modulator 30 of each station will only produce usable audio information when the carrier and modulating signal frequencies are substantially equal. Since calling station 14 is now adjusted to transmit at 12.01 MHz, the modulator 30 in called station 12 will pass the audio signal modulating the 12.01 MHz signal from station 14 as station 12 is applying that same frequency to its third modulator 30 as its fixed home receive frequency. The output of the modulator 30 is then filtered by the band pass filter 32 to assure that only the audio frequency $f_{audio}$ reaches the receiver within the handset of station 12. It should also be noted that the adjusted frequency applied to the third balanced modulator within station 14 of 14.51 MHz is the fixed transmit frequency of station 12.

When station 12 removes its handset, the audio signal $f_{audio}$ applied to the input of the first balanced modulator modulates the reference frequency $f_r$. The output $f_r \pm f_{audio}$ is filtered by filter 22 and applied as $f_r + f_{audio}$ to the input of the second balanced modulator 24. At the balanced modulator 24, these signals are combined such that the output of the modulator 24 is $f_s + f_r$ or 14.51 MHz. The band pass filter 29 filters all signals but those included in the home transmit frequency range shown in FIG. 2*a*. Thus, the carrier frequency of 14.51 MHz is applied to the magnetic coupler 16 and over the highway 18 to the coupler 16 of station 14. Station 14 previously adjusted its synthesizer upon calling station 12 to apply the signal $f_s + f_r$ or 14.51 MHz to the input of the balanced modulator 30. As a result, the output of the balanced modulator 30 in calling station 14 includes only the audio frequency modulating the carrier frequency 14.51 MHz (the fixed transmit frequency of station 12), which is filtered by the filter 32 for applying $f_{audio}$ to the station 14. This completes the audio connection between the two stations.

There are other methods of utilizing the equipment described herein to achieve communication. In the system demonstrated, a calling station sets its own synthesizer so that it receives the called station transmitter frequency. An alternate system can be derived in which the opposite is accomplished. That is, the called station is set by the calling station. A third variant can be derived in which all receiving frequencies are adjusted by signaling from a common source. These variations are usable in certain applications, but the most generally applicable approach is the approach described hereinabove.

It should also be observed that each station may be easily modified to change its fixed home transmit and receive frequency. This allows for easy resetting of the telephone number of each station. Further, broad band transmission of data signals is simply accomplished by assigning a plurality of channels to a data station. For example, if it were desirable to transmit a 1–40 KHz data signal at a fixed home frequency of 12.05 MHz, channels 12.01 through 12.09 could be used. This would provide a 7 KHz guard band on each side of the data channel. Only the band pass width of filters 22 and 32 would require adjustment. Additionally, broader band data, such as television signals, may be accommodated on additional channels outside the bandwidth of the telephone system since coaxial cables are typically capable of carrying bandwidths 10 to 20 times as wide as that described herein.

We claim:

1. A telephone communications system utilizing frequency division multiplexing, comprising:

a plurality of telephone stations joined together by a single coaxial cable;

means connected to said single coaxial cable, for generating a single reference frequency in said cable whereby said plurality of telephone stations are supplied with a said single reference frequency;

each of said telephone stations including selectively predeterminable frequency generating means for establishing a predetermined transmit and a predetermined receive frequency distinctive from the frequencies of all other stations;

means connected to said frequency generating means adapted to adjust the predetermined transmit frequency of a calling station to the distinctive predetermined receive frequency of a station being called, and adapted to adjust to the predetermined receive frequency of said calling station to the predetermined transmit frequency of said called station, whereby said calling and called stations are linked to each other by frequency division multiplexing over a single coaxial cable.

2. A telephone communications system utilizing frequency division multiplexing, as claimed in claim 1, wherein:

the difference between said fixed transmit frequency and said fixed receive frequency of each of said plurality of telephone stations is equal to said single reference frequency.

3. A frequency division multiplexing system for communication between a plurality of stations, comprising:

magnetic coupling means connecting each of said stations to a single cable;

each of said plurality of stations having a transmit circuit means and a receive circuit means for respectively transmitting signals to and receiving signals from said magnetic coupling means;

means for generating a common reference frequency signal supplied to each said magnetic coupling means;

means for introducing said reference frequency signal in said magnetic coupling means into said transmit circuit means of each station to provide a first carrier frequency for transmitted information;

generating means generating a second frequency signal;

means for introducing a selected second frequency signal into said transmit circuit means of each station to provide a second frequency to be modulated by said first carrier frequency for establishing a transmit carrier frequency in said transmit circuit means to be passed through said magnetic coupling means to said cable; and generating means at another of said stations generating a third, modulated carrier frequency signal carrying information to be received;

means for receiving said third carrier frequency signal into said receive circuit means of each station, said receiving means selectively demodulating said third carrier frequency thereby delivering received information to said station; wherein said established transmit carrier frequency and said third carrier frequency differ from each other by an amount equalling said reference frequency signal whereby a paired frequency communications plan system is defined.

4. A frequency division multiplexing system for communication between a plurality of stations, as claimed in claim 3, additionally comprising:

said means for introducing said second frequency signal into said transmit circuit means and said means for introducing said third frequency signal into said receive circuit means include single adjustable means for predetermining the second frequency signal;

said means for introducing said second frequency signal into said transmit circuit means further introducing said predetermined second frequency signal into said transmit circuit means, whereby a predeterminable transmit carrier frequency is established;

said means for introducing said second frequency signal into said transmit circuit means further introducing said second frequency signal into said receive circuit means for establishing a predeterminable receive carrier frequency thereby defining a fixed-adjustable paired frequency communications plan.

5. A frequency division multiplexing system for communications between a plurality fo stations, as claimed in claim 3, wherein:

said means for introducing said reference frequency signal into said transmit circuit means includes a first balanced modulator disposed serially with a source of transmitted communication;

said means for introducing a second frequency signal into said transmit circuit means includes a second balanced modulator disposed serially with said first balanced modulator; and said means for introducing said second frequency signal into said receive circuit means includes a third balanced modulator disposed to receive modulated frequencies from said magnetic coupling means.

6. A frequency division multiplexing system for communication between a plurality of stations, as claimed in claim 4, wherein:

said single adjustable means for providing a predeterminable second frequency signal include programable digital frequency synthesizer means.

7. A telephone communications system utilizing frequency division multiplexing, comprising;

a plurality of subscriber stations;

a single coaxial cable in signal communications connection with each of said plurality of subscriber stations;

means connected to said single coaxial cable for generating a system reference frequency signal into said coaxial cable;

each of said subscriber stations including magnetic coupling means connecting each of said plurality of subscriber stations to said single coaxial cable, said magnetic coupling means providing said reference frequency signal to each station;

programable digital frequency synthesizer means within each station for generating a fixed frequency signal;

first balanced modulator means connected in a transmit circuit means within each station adapted to receive an audio signal from each station and said reference frequency signal for generating a modulated audio signal whose carrier is said reference frequency signal;

second balanced modulator means connected in said transmit circuit means within each station to receive said modulated audio signal from said first balanced modulator means and to receive said fixed frequency signal from said programable digital frequency synthesizer means for generating a modulated transmit signal whose carrier combines said modulated audio signal and said fixed frequency signal and conveys the resultant signal to said magnetic coupler means and said coaxial cable thus establishing the fixed transmit frequency signal of each of said stations; and third balanced modulator means connected in a receive circuit means within each station to receive said fixed frequency signal from said programable digital frequency synthesizer means and to receive a fixed transmit frequency signal from another of said plurality of subscriber stations for generating a demodulated audio signal to said station when said fixed frequency signal and said fixed transmit frequency signal are of equal frequencies, thus establishing a fixed receive frequency signal of each of said stations, whereby said fixed transmit frequency signal and said fixed receive frequency signal of each of said plurality of subscriber stations differs by an amount equal to said reference frequency signal.

8. A telephone communications system utilizing frequency division multiplexing, as claimed in claim 7, wherein:

said programmable digital frequency synthesizer means includes means for adjusting said fixed frequency signal to allow each of said stations to call another of said plurality of subscriber stations by adjusting the fixed frequency signal to include a value equal to said fixed receive frequency signal of the station being called plus said reference frequency signal;

said second balanced modulator means in said transmit circuit path receiving said adjusted, fixed frequency signal including said fixed receive frequency signal of the station being called plus said reference frequency signal and receiving said audio signal whose carrier is said reference frequency signal wherein the generated output of said second balanced modulator becomes said fixed receive frequence signal of the station being called and said fixed receive frequence signal of the station being called plus twice the reference frequency signal which is beyond the usable band of the telephone communications system and unused by the system; and said third balanced modulator means in said receive circuit path receiving said adjusted, fixed frequency signal including said fixed receive frequency signal of the station being called plus said reference frequency signal which is the fixed transmit frequency signal of the station being called for demodulating said fixed transmit frequency signal of the station being called.

9. A communications system utilizing frequency division multiplexing for communication of information, comprising:

a plurality of stations;

cable means linking said plurality of stations;

each station including a transmit and a receive circuit means connecting said station to said cable means;

means for generating a system reference frequency signal and introducing said signal into said transmit circuit means of each of said plurality of stations;

means in said transmit circuit means for modulating said information to be communicated on said system reference frequency signal:

adjustable means connected to said transmit and receive circuit means for establishing a station frequency signal;

means in said transmit circuit means for combining said information to be communicated on said system reference frequency signal, and modulating said station frequency signal by this combination to establish a station transmit frequency signal transmitted to said cable means from each of said plurality of stations;

means in said receive circuit means for combining said station frequency signal and said station transmit frequency signal received by each of said plurality of stations from said cable means and for detecting said information to be communicated when the frequency of said station frequency signal equals the frequency of said received station transmit frequency signal, said station frequency signal of each station thus becoming the station receive frequency signal of that station;

said plurality of stations each transmitting at a station transmit frequency signal and receiving at a station receive frequency signal differing from each other by an amount equal to said system reference frequency signal; and said adjustable means for establishing a station frequency signal in each of said stations adjustable, when one of said stations is calling another, to vary said station frequency signal for adjusting said transmit frequency signal of said calling station to match said receive frequency signal of the station being called, and for adjusting said receive frequency signal of said calling station to match said transmit frequency signal of the station being called.

10. A communications system utilizing frequency division multiplexing for communication of information between a plurality of stations, comprising: a single coaxial cable linking all of said stations;

means disposed in electromagnetic connection to said cable for generating a system reference signal in said cable;

a transmit circuit means and a receive circuit means connecting each of said stations to said coaxial cable;

means for establishing a first predeterminable frequency;

means connected in said receive circuit means to receive said first predeterminable frequency for establishing a predeterminable station receive demodulating frequency;

means connected in said transmit circuit means to receive said first predeterminable frequency and said system reference frequency for establishing a predeterminable station transmit frequency; and means for adjusting said means for establishing a first predeterminable frequeny to establish an adjustable frequency which is received by said means connected in said transmit circuit means along with said system reference freqeuncy to establish an adjustable station transmit carrier frequency equal to said predeterminable station receive demodulating frequency of a station to be called, and which adjustable frequency is also combined by said means connected in said receive circuit means to establish an adjustable station receive demodulating frequency equal to said predeterminable station transmit frequency of a station to be called.

* * * * *